(12) United States Patent
Smith et al.

(10) Patent No.: US 7,428,779 B2
(45) Date of Patent: Sep. 30, 2008

(54) ENDPLAY MEASUREMENT TOOL AND METHOD

(75) Inventors: Rand D. Smith, Springfield, OH (US); Thomas Reynolds, Xenia, OH (US); Sylvester Sample, Columbus, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 169 days.

(21) Appl. No.: 11/380,679

(22) Filed: Apr. 28, 2006

(65) Prior Publication Data

US 2007/0294900 A1    Dec. 27, 2007

(51) Int. Cl.
*G01B 5/24* (2006.01)
(52) U.S. Cl. ............... 33/203.18; 33/203.2; 29/273
(58) Field of Classification Search . 33/203.18–203.21, 33/517; 29/273, 252; 73/118.1
See application file for complete search history.

(56) References Cited

U.S. PATENT DOCUMENTS

| | | | | |
|---|---|---|---|---|
| 3,445,936 A | * | 5/1969 | Wilkerson | 33/288 |
| 5,033,003 A | * | 7/1991 | Lees, Sr. | 701/124 |
| 5,058,424 A | | 10/1991 | O'Hara | |
| 5,648,846 A | * | 7/1997 | Douine et al. | 356/139.09 |
| 6,058,767 A | * | 5/2000 | Calvin | 73/118.1 |
| 6,662,449 B2 | * | 12/2003 | Rode | 29/898.09 |
| 6,684,517 B2 | * | 2/2004 | Corghi | 33/550 |
| 6,766,686 B2 | * | 7/2004 | Greubel | 73/162 |

* cited by examiner

*Primary Examiner*—G. Bradley Bennett
*Assistant Examiner*—Tania C Courson
(74) *Attorney, Agent, or Firm*—Jeffrey P. Calfa; Gerald W. Askew

(57) ABSTRACT

A tool (10) and method for measuring endplay between an axle shaft (36) and an axle hub (34) of an axle assembly. A mounting plate (22) is fastened to the hub, and one end of a through-rod (16) whose ends protrude from opposite ends of a housing (14) of a fluid-operated device (12) is fastened to the axle shaft by applying an external force to the other end of the through-rod while fluid is not operating the fluid-operated device. With the mounting adapter and the through-rod secured as described, fluid is delivered to the fluid-operated device to move the through-rod relative to the housing, and the resulting relative movement between the through-rod and the housing is measured by a measuring device (48).

12 Claims, 2 Drawing Sheets

ENDPLAY MEASUREMENT TOOL AND METHOD

FIELD OF THE INVENTION

This invention relates to a tool and method for measuring endplay between parts in an assembly. More particularly, the invention relates to a tool and method for measuring axial endplay between a hub and shaft that are on an end of an axle assembly for a motor vehicle such as a large truck.

BACKGROUND OF THE INVENTION

A typical large truck comprises axle assemblies on which wheels are mounted. At its opposite ends, a typical front axle assembly comprises steerable shafts, or spindles, and hubs journaled for rotation on the shafts, or spindles. The hubs have circular patterns of outwardly protruding screw studs, or lugs, that match circular bolt hole patterns in the hubs of the wheels to allow the wheels to be placed onto the axle hubs with the lugs on the axle hubs protruding through the holes of the bolt hole patterns in the wheel hubs. Lug nuts are then threaded onto ends of the lugs and tightened to force the wheel hubs against the faces of the axle hubs thereby securing the wheels to the axle hubs.

The construction of mass-produced axle assemblies inherently results in some axial end play of the axle hubs on the axle shafts, and because wheels are fastened to the axle hubs, the wheels will have also have endplay on the axles. While a limited amount of endplay may be acceptable, excessive endplay is undesirable for various and obvious reasons.

Consequently, measurement of such endplay is an important part of quality control in a manufacturing process.

Prior to the present invention, a manual method that uses a dial indicator was one method for measuring axial endplay between the hub and shaft. The hub is pushed and pulled by paddles, and the dial indicator measures axial movement of the hub relative to the end of the axle shaft. Accuracy and repeatability of the measurements obtained by the manual method are subject to human influences by the very nature of the method.

Another prior method involves use of a measuring tool having a pneumatic actuator for pulling the hub via the hub cap mounting holes. But that tool has to be manually installed and removed, and its installation, use, and removal are considered difficult and time-consuming.

Consequently, it is believed that a method that is less subject to human influences would be a desirable improvement, especially in view of increased emphasis on manufacturing quality.

In addition, a tool that is easier and quicker to install, use, and remove would be desirable for improving productivity in a manufacturing facility.

SUMMARY OF THE INVENTION

The present invention provides a new tool for measuring endplay in a more convenient and efficient way, and with improved accuracy and repeatability.

Briefly, the tool comprises a pneumatic cylinder for pushing and pulling the axle hub relative to the axle shaft with a repeatable force. The pneumatic cylinder is a "though-shaft" cylinder, meaning that the cylinder shaft, or cylinder rod, that is displaced axially by introducing air under pressure into the cylinder housing protrudes from opposite ends of the housing, not just one end. This allows an internally threaded socket to be attached to one axial end of the rod and a tightening/untightening handle, or knob, to be attached to the other end.

A mounting plate is supported on the cylinder housing and is disposed at the same axial end of the housing as the end of the cylinder rod to which the threaded socket is attached. The mounting plate has a generally rectangular shape that is noticeably longer than wider, giving the mounting plate the appearance of a long bar. The mounting plate has several through-holes running in the direction of the bar thickness. One central through-hole serves as a clearance hole for the threaded socket. Outer through-holes are located equidistant from the central through-hole and lie on a diameter of the lug pattern of the axle hub.

The tool is installed on an axle assembly using the mounting plate as an adapter member for mounting the pneumatic cylinder on the axle assembly. The outer through-holes in the mounting plate are registered with diametrically opposite lugs of the axle hub and the tool is advanced toward the axle hub to place the mounting plate on the axle hub with the diametrically opposite lugs protruding through the outer through-holes in the mounting plate. Nuts are then threaded onto the ends of the lugs and tightened to force the mounting plate against the axle hub thereby securing the tool to the axle hub.

In the absence of air under pressure being applied to the pneumatic cylinder, the cylinder rod can both turn and translate relative to the cylinder housing. With that capability in that condition the tightening/untightening knob at one end of the cylinder rod can be used to push the threaded socket on the opposite end of the rod into engagement with the threaded end of the axle shaft and then turned to screw the socket tightly onto the axle shaft.

With the cylinder rod now securely attached to the axle shaft and with the cylinder housing now securely attached to the axle hub, air under pressure can be applied selectively to the cylinder to move the rod in opposite directions. When the rod is moved in one direction, it will pull the axle hub relative to the axle shaft, and when the rod is moved in the opposite direction, it will push the axle hub relative to the axle shaft. Consequently, the amount of travel of the cylinder rod relative to the cylinder housing corresponds exactly to the amount of axial endplay between the axle hub and the axle shaft.

The air that is applied to the pneumatic cylinder under pressure is plant, or shop, air. A two-position, four-way, spring-return-to-center valve mounts on the cylinder housing with valve ports properly connected via air passages with ports on the cylinder housing, and with a port connected to plant air. In the center position, the valve shuts off plant air to the cylinder.

When the valve operates to one side of center, it causes plant air to be delivered to one end of the cylinder while exhausting the other end of the cylinder. That causes the cylinder rod to be displaced toward that other cylinder end.

When the valve operates to the other side of center, it causes plant air to be delivered to the other end of the cylinder while exhausting the one end, and that causes the cylinder rod to be displaced toward the one end.

With the tool installed as described above, operating the valve to cycle the cylinder rod back and forth will enable axle hub endplay to be accurately measured because the extent to which the cylinder rod is displaced is limited by, and corresponds exactly to, the amount of endplay.

The actual measurement of axle hub endplay can be measured in different ways. One convenient way of doing so is by using a measuring device having a body from which a probe protrudes. The probe can be displaced linearly on the body, and as it is being displaced, it causes the device to provide a measurement of the amount of the displacement. The measuring device has sufficient resolution to measure endplay to several decimals if desired.

Such a device can be associated with the tool by mounting the body of the device on the exterior of the pneumatic cylinder housing in such a way as to cause the probe to track displacement of the cylinder rod. In the tool that is illustrated here, the measuring device body is mounted on the exterior of the cylinder housing with the probe motion parallel to the direction of cylinder rod displacement. The probe tip is biased against a reference member that moves with the cylinder rod. The reference member is a circular disk that is fit to the cylinder rod proximate the tightening/untightening knob and that is affixed to the rod, to the knob, or to both.

The tool is characterized by advantages other than merely more convenient installation, use, and removal. It has a size whose overall length in the direction of measurement is sufficiently short that it makes it well suited for used on an assembly, or manufacturing, line in a production area where space may be limited. Further constructional features not specifically discussed yet allow the tool to be suspended from an overhead rail on a "0-gravity" balancer in a way that enables it to be promptly and conveniently moved from a stowed location above the assembly area into alignment with an axle assembly and installed. After the endplay measurement has been obtained, the tool is disconnected and returned to the stowed location.

For measuring axle hub endplay, the tool is brought down from the stowed location and installed on an axle assembly in the manner described. A hose for supplying plant air is connected to the valve. The valve is then operated to either pull or push the axle hub relative to the axle shaft. Pressure is maintained while the measuring device is set to zero. The valve is then operated to move the cylinder rod in the direction opposite the one in which it was being forced while the measuring device was being zeroed, and to keep the force applied. The amount of movement of the rod equals the amount of hub endplay on the axle shaft. The valve may be cycled to obtain multiple measurements to prove repeatability. The air hose is disconnected, and the tool is then unfastened from the axle assembly by unthreading the socket from the axle shaft, unthreading the lug nuts from the hub lugs, and pulling the tool away from the axle assembly. The tool can then be returned to stowage out of the way of the production line.

One generic aspect of the present invention relates to a tool for measuring play between relatively movable parts of an assembly. The tool has a fluid-operated device comprising a housing and a through-rod that has opposite ends protruding from opposite ends of the housing and that is movable relative to the housing.

A first element on one end of the through-rod attaches the through-rod to one of the relatively movable parts. A second element attaches the housing to the other of the relatively movable parts. A third element on the other end of the through-rod can move the through-rod to attach the first element to the one part when fluid is not operating the device.

A measuring device measures relative movement that occurs between the through-rod and the housing when, with the first element attached to the first part and the second element attached to the second part, fluid operates the fluid-operated device to impart movement to the through-rod.

Another generic aspect relates to a method of using a measuring tool having a fluid-operated device, to a housing of which a mounting adapter is attached, for measuring endplay between relatively movable parts of an axle assembly.

Outer through-holes of the mounting adapter are registered with diametrically opposite lugs of an axle hub, and the tool is advanced toward the axle hub to place the mounting adapter on the axle hub with the diametrically opposite lugs protruding through the through-holes. The mounting adapter is secured to the axle hub by threading lug nuts onto the ends of the lugs and tightening the lug nuts.

One of opposite ends of a through-rod that protrude from opposite ends of the housing of the fluid-operated device are secured to an axle shaft by applying an external force to the other of the opposite ends of the through-rod while fluid is not operating the fluid-operated device.

With the mounting adapter and the through-rod secured as described, fluid is delivered to the fluid-operated device to move the through-rod relative to the housing, and the resulting relative movement between the through-rod and the housing is measured.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
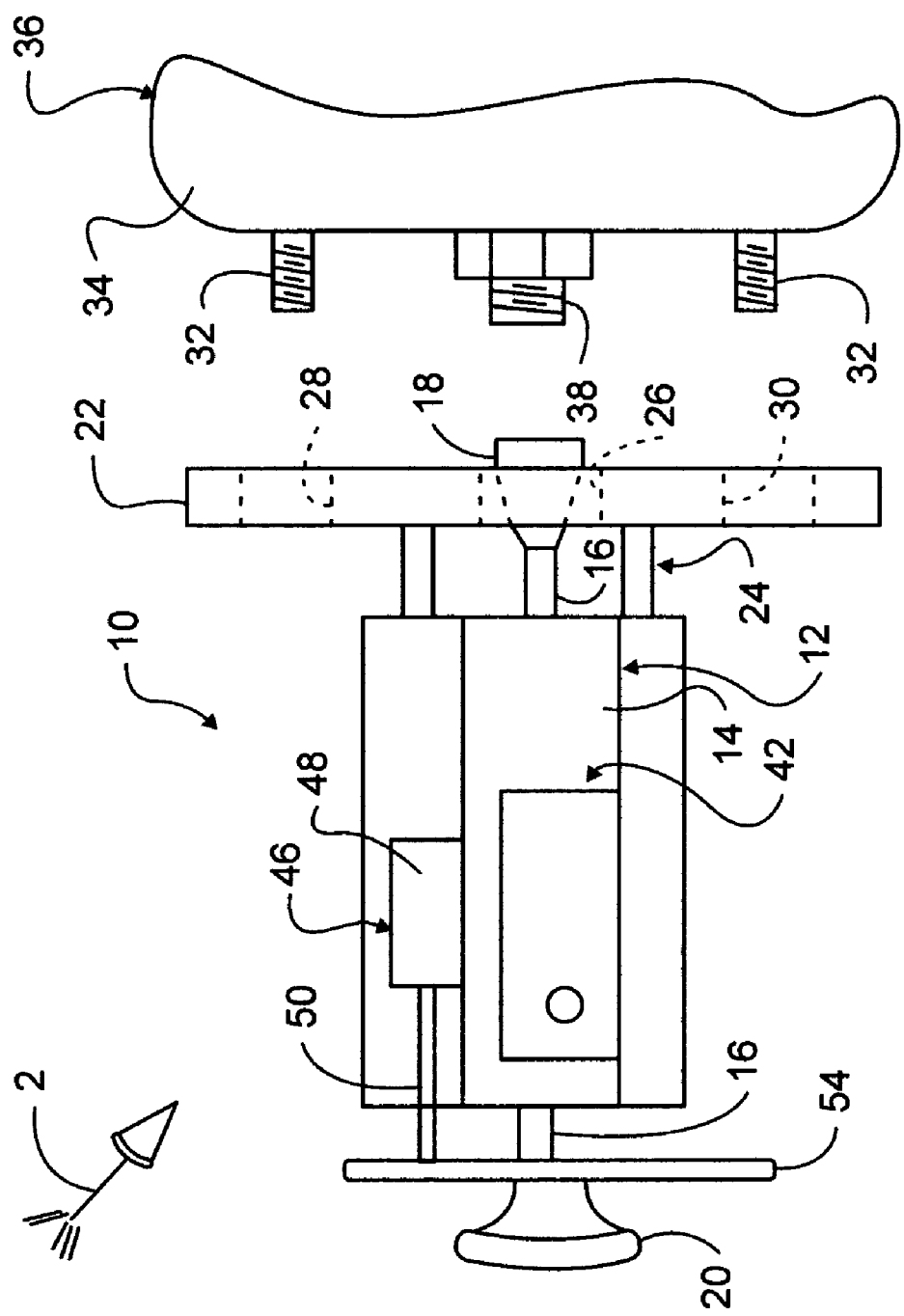
FIG. 1 is a side elevation view, somewhat schematic in nature, showing a portion of a preferred embodiment of tool in position for installation on an axle assembly.
Figure 2:
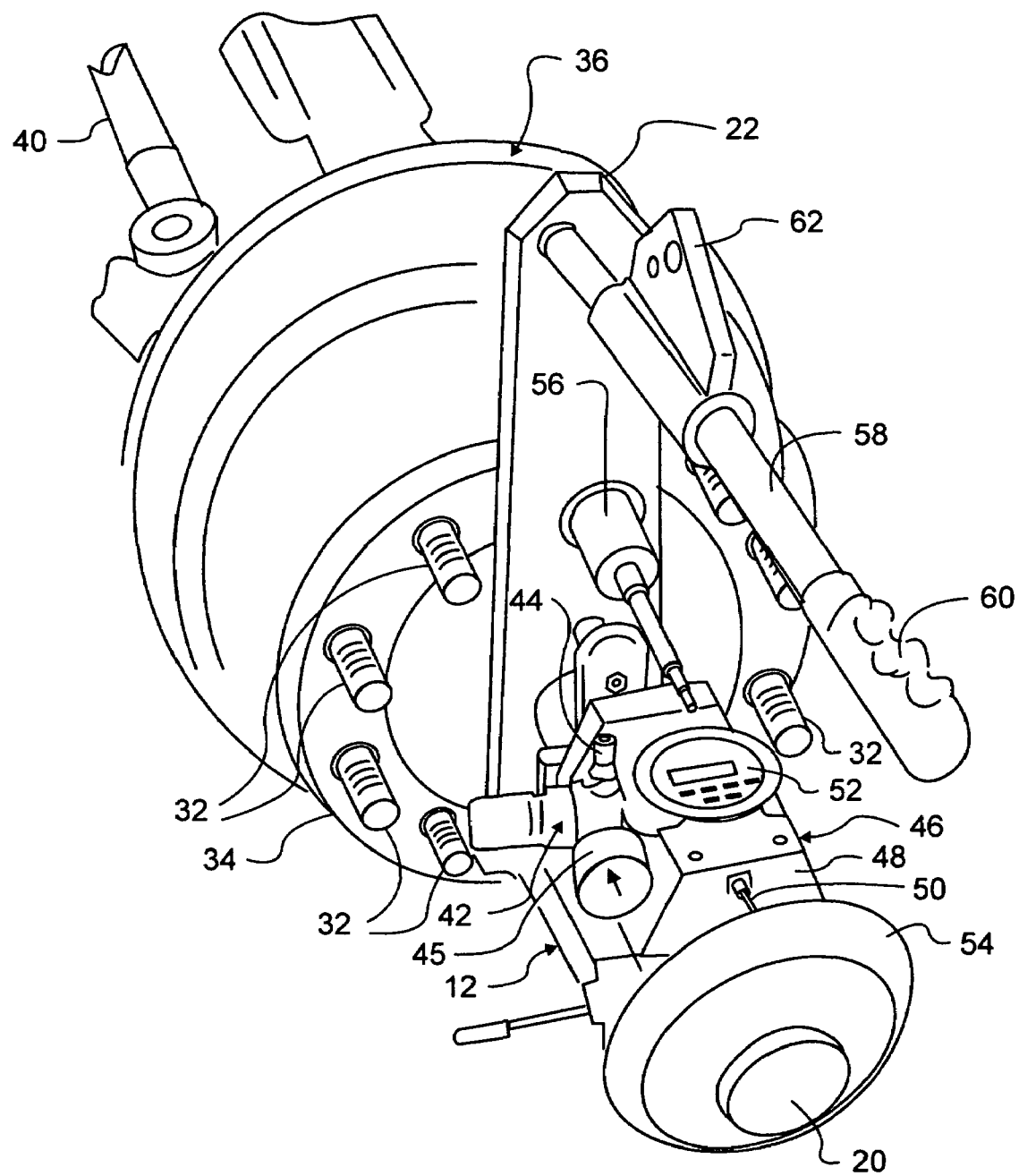
FIG. 2 is a perspective view in the general direction of arrow 2 in FIG. 1 showing, in a less schematic way than FIG. 1, more detail with the tool installed on the axle assembly.

FIGS. 1 and 2 show tool 10 to comprise a pneumatic cylinder 12 having a cylinder housing 14 and a though-shaft, or through-rod, 16 running completely through housing 14 so as to protrude from opposite ends of the housing. An internally threaded socket 18 is attached to one axial end of rod 16 and a tightening/untightening handle, or knob, 20 is attached to the other end.

A mounting plate 22 is supported on housing 14 and is disposed at the same axial end of the housing as the end of rod 16 to which socket 18 is attached. Mounting plate 22 adapts cylinder 12 for mounting on an axle hub and is attached to the exterior of housing 14 through a mounting structure 24 that places mounting plate 22 a short distance frontally of the housing.

Mounting plate 22 has a generally rectangular shape that gives the mounting plate the appearance of a long, generally flat bar as perhaps better seen in FIG. 2. Mounting plate 22 comprises several through-holes running in the direction of the bar thickness, one of which is a central through-hole 26 that serves as a clearance hole for socket 18. Outer through-holes 28, 30 are located equidistant from through-hole 26 and their centers lie on a diameter of the pattern of lugs 32 on a hub 34 of an axle assembly 36 shown as a front axle containing a generally horizontal axle spindle, or shaft, 38 that can be turned about a generally vertical axis by a tie rod 40 of a vehicle steering system.

A two-position, four-way, spring-return-to-center valve 42 mounts on housing 14. Valve 42 comprises ports connected through passages with ports on housing 14 and a port 44 that provides for a plant air hose (not shown) to be connected to the valve to supply air under pressure (compressed air) as pneumatic power for operating cylinder 12. FIG. 2 shows a pressure gauge 45 communicated to a port of the valve.

A measuring device 46 has a body 48 from which a probe 50 protrudes. Probe 50 can be displaced linearly on body 48, and as it is being displaced, it causes device 46 to provide a measurement of the amount of the displacement. The measurement is given by a reading on a face 52 of the device. Device 46 would therefore be commonly understood as a dial indicator or equivalent, and it can have sufficient resolution to measure endplay to several decimal points if desired.

Device body 48 mounts on the exterior of cylinder housing 14 in such a way as to enable probe 50 to track, or follow, displacement of cylinder rod 16. In the illustrated tool 10, body 48 is disposed to place the direction of probe displacement parallel with the direction of cylinder rod motion. The probe tip is biased against a reference member 54 that moves with cylinder rod 16. Reference member 54 comprises a circular disk that is fit to the cylinder rod proximate tightening/untightening knob 20 and that is affixed to rod 16, to knob 20, or to both.

Tool 10 is installed on axle assembly 36 by registering outer through-holes 28, 30 with diametrically opposite lugs 32 of axle hub 34, as shown in FIG. 1, and then advancing the tool toward the axle hub. The tool is advanced so as to place mounting plate 22 on axle hub 34 with the diametrically opposite lugs protruding through holes 28, 30. Lug nuts (not shown) are then threaded onto the ends of the lugs and tightened, such as by a socket 56 (shown in FIG. 2) operated by a power driver (not shown), to force mounting plate 22 against axle hub 34 thereby securing tool 10 to the axle hub.

In its center position, valve 42 shuts off plant air to cylinder 12. In the absence of air under pressure being applied to cylinder 12, rod 16 can both turn and translate relative to cylinder housing 14. In that condition, the ability to both turn and displace the rod allows knob 20 to be used to move socket 18 into engagement with the threaded end of axle shaft 38 and then turned to screw the socket tightly onto the axle shaft. Knob 20 provides a person grasping it with a mechanical advantage for turning rod 16.

With rod 16 now securely attached to axle shaft 38 and with cylinder housing 14 now securely attached to axle hub 34, valve 42 can be operated to cause air under pressure to be applied selectively to cylinder 12 to move rod 16 in opposite directions.

When valve 42 is operated to move rod 16 in one direction, the rod will pull axle hub 34 relative to axle shaft 38. When the valve is operated to move rod 16 in the opposite direction, the rod will push the axle hub relative to the axle shaft. Consequently, the amount of travel of cylinder rod 16 relative to cylinder housing 14 corresponds exactly to the amount of axial endplay between the axle hub and the axle shaft.

For obtaining an endplay measurement by this method, the ports of valve 42 are properly connected through passages with ports on cylinder housing 14 so that when the valve operates to one side of center, it causes plant air to be delivered to one end of the cylinder while exhausting the other end of the cylinder, resulting in rod 16 being displaced toward that other end. When the valve operates to the other side of center, it causes plant air to be delivered to the other end of the cylinder while exhausting the one end, resulting in rod 16 being displaced toward the one end.

With tool 10 installed as described above, operating valve 42 to cycle cylinder rod 16 back and forth enables axle hub endplay to be accurately measured because the extent to which the cylinder rod is displaced is constrained by, and therefore corresponds exactly to, the amount of endplay.

For efficiently measuring axle hub endplay in a production line setting, tool 10 further comprises a handle bar 58. One end is fastened to mounting plate 22 near the top of the mounting plate. A hand grip 60 is on the opposite end of the bar. A bracket 62 is on the bar between mounting plate 22 and hand grip 60 and serves to allow the tool to be suspended from an overhead rail on a "0-gravity" balancer in a way that enables tool 10 to be grasped and quickly brought into alignment with an axle assembly and installed.

After that, a plant air hose is connected to port 44, and valve 42 is operated to either pull or push the axle hub relative to the axle shaft. Pressure is maintained while measuring device 46 is zeroed. Valve 42 is then operated to move rod 16 in the direction opposite the one in which it was being forced while the measuring device was being zeroed. The amount of movement will be the amount of endplay. The valve may be cycled to obtain multiple measurements to prove repeatability. Then the air hose is disconnected from the valve and the tool is unfastened from the axle assembly by turning knob 20 to unthread socket 18 from axle shaft 38, by unthreading the lug nuts from lugs 32, and then pulling tool 10 off the hub.

In light of the description presented here, the reader can appreciate that a tool and method embodying principles of the invention offers improved convenience and efficiency in obtaining endplay measurements.

While a presently preferred embodiment of the invention has been illustrated and described, it should be appreciated that principles of the invention apply to all embodiments falling within the scope of the following claims.

What is claimed is:

1. A tool for measuring play between relatively movable parts of an assembly, comprising:
   a fluid-operated device comprising a housing and a through-rod that has opposite ends protruding from opposite ends of the housing and that is movable relative to the housing;
   a first element on one end of the through-rod for attaching the through-rod to one of the relatively movable parts;
   a second element for attaching the housing to the other of the relatively movable parts;
   a third element on the other end of the through-rod for moving the through-rod to attach the first element to the one part when fluid is not operating the device; and
   a measuring device comprising a body mounted on the housing of the fluid operated device for measuring relative movement that occurs between the through-rod and the housing when, with the first element attached to the first part and the second element attached to the second part, fluid operates the fluid-operated device to impart movement to the through-rod.

2. A tool as set forth in claim 1 wherein the first element comprises an internally threaded socket providing for attachment of the through-rod to the first part by turning of the through-rod by the third element.

3. A tool as set forth in claim 2 wherein the third element comprises a handle that is adapted to be manually grasped and that is shaped to provide a mechanical advantage for manually turning the through-rod.

4. A tool as set forth in claim 1 wherein the measuring device comprises a probe that protrudes from the measuring device body and that is positionable on the measuring device body for causing the measuring device to signal position of the probe relative to the measuring device body, and wherein the probe is biased against an element that moves with the through-rod such that the probe tracks the position of the through-rod.

5. A tool as set forth in claim 1 wherein the second element comprises a mounting adapter having a central through-hole providing dimensional clearance for the one end of the rod and the first element to pass through the adapter and two additional through-holes equally spaced from the central through-hole, all three through-holes lying on a common diameter of a circle.

6. A tool as set forth in claim 1 further comprising a fluid valve that has a body mounted on the housing of the fluid-operated device and that provides control of fluid to the fluid-operated device to control of movement of the through-rod.

7. A tool as set forth in claim 6 wherein the fluid valve comprises a two-position, four-way, spring-return-to-center pneumatic valve that when centered, shuts off pneumatic power to the fluid-operated device, when operated to one side of center, enables pneumatic power to move the through-rod in one direction on the housing, and when operated to the other side of center, enables pneumatic power to move the through-rod in the other direction on the housing.

8. A method of using a measuring tool having a fluid-operated device, to a housing of which a mounting adapter is attached, for measuring endplay between relatively movable parts of an axle assembly, the method comprising:

registering outer through-holes of the mounting adapter with diametrically opposite lugs of an axle hub and advancing the tool toward the axle hub to place the mounting adapter on the axle hub with the diametrically opposite lugs protruding through the through-holes, securing the mounting adapter to the axle hub by threading lug nuts onto the ends of the lugs and tightening the lug nuts, securing to an axle shaft one of opposite ends of a through-rod that protrude from opposite ends of the housing of the fluid-operated device by applying an external force to the other of the opposite ends of the through-rod while fluid is not operating the fluid-operated device, with the mounting adapter and the through-rod secured, delivering fluid to the fluid-operated device to move the through-rod relative to the housing, and measuring resulting relative movement between the through-rod and the housing.

9. A method as set forth in claim 8 wherein the step of securing to the axle shaft one of opposite ends of the through-rod comprises applying turning force to the other of the opposite ends of the through-rod to cause an internally threaded socket at the one of the opposite ends to thread tightly onto a threaded end of the axle shaft.

10. A method as set forth in claim 9 wherein the step of applying turning force comprises applying the turning force through a handle that provides a mechanical advantage.

11. A method as set forth in claim 8 wherein the step of measuring resulting relative movement between the through-rod and the housing comprises measuring relative movement between a probe and a body of a measuring device associated with the fluid-operated device by mounting the body of the measuring device on the housing of the fluid-operated device and biasing the probe against an element on the through-rod to follow motion of the through-rod.

12. A method as set forth in claim 8 wherein the step of delivering fluid to the fluid-operated device comprises controlling the operation of a fluid valve to selectively deliver fluid to the fluid-operated device for causing the through-rod to be selectively moved in opposite directions.

\* \* \* \* \*